US008385712B2

(12) United States Patent
Ahmed (10) Patent No.: US 8,385,712 B2
(45) Date of Patent: Feb. 26, 2013

(54) CABLE PULLING ASSEMBLY

(75) Inventor: Foad Abdulakdir Mohamed Ahmed, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/389,474

(22) Filed: Feb. 20, 2009

(65) Prior Publication Data
US 2009/0238534 A1    Sep. 24, 2009

Related U.S. Application Data

(60) Provisional application No. 61/032,806, filed on Feb. 29, 2008.

(51) Int. Cl.
*G02B 6/00* (2006.01)
*B23P 11/00* (2006.01)

(52) U.S. Cl. .......................... 385/136; 29/438
(58) Field of Classification Search .................. 385/134, 385/136, 137
See application file for complete search history.

(56) References Cited

U.S. PATENT DOCUMENTS

| 2,231,919 | A |   | 2/1941 | Kent |
| 3,672,006 | A |   | 6/1972 | Fidrych |
| 3,858,848 | A |   | 1/1975 | MacFetrich |
| 3,906,619 | A |   | 9/1975 | Shaffer |
| 4,368,910 | A |   | 1/1983 | Fidrych |
| 4,453,291 | A |   | 6/1984 | Fidrych |
| 4,460,159 | A |   | 7/1984 | Charlebois et al. |
| 4,684,161 | A |   | 8/1987 | Egner et al. |
| 4,684,211 | A | * | 8/1987 | Weber et al. ............... 385/136 |
| 4,736,978 | A |   | 4/1988 | Cielker |
| 5,013,125 | A |   | 5/1991 | Nilsson et al. |
| 5,039,196 | A |   | 8/1991 | Nilsson |
| 5,067,843 | A |   | 11/1991 | Nova |
| 5,122,007 | A |   | 6/1992 | Smith |
| 5,133,583 | A |   | 7/1992 | Wagman et al. |
| 5,245,730 | A |   | 9/1993 | Martin |
| 5,283,930 | A |   | 2/1994 | Krauss |
| 5,308,026 | A |   | 5/1994 | Shaw |
| 5,480,203 | A |   | 1/1996 | Favalora et al. |
| 5,863,083 | A |   | 1/1999 | Giebel et al. |
| 5,938,180 | A |   | 8/1999 | Walsten |
| 6,266,469 | B1 | * | 7/2001 | Roth ........................... 385/136 |
| 6,396,993 | B1 |   | 5/2002 | Giebel et al. |

(Continued)

FOREIGN PATENT DOCUMENTS

DE    42 00 865 A1    7/1993
WO    WO 2005/072395 A2    8/2005

OTHER PUBLICATIONS

International Search Report and Written Opinion mailed May 13, 2009.

*Primary Examiner* — Sarah Hahm
(74) *Attorney, Agent, or Firm* — Merchant & Gould P.C.

(57) ABSTRACT

A cable pulling assembly includes a pulling sleeve, which includes a bore, and a base assembly. The base assembly is selectively engaged with the bore of the pulling sleeve. The base assembly includes a first base member and a second base member. The first and second base members cooperatively define a cable channel. The cable channel includes a plurality of gripping protrusions. A method of assembling a cable pulling assembly includes inserting a portion of a cable into a first channel of a first base member of a base assembly. The first channel in friction fit engagement with the cable. A second base member of the base assembly is engaged to the first base member. The second base member defines a second channel. A connectorized end of the cable is inserted into a bore of a pulling sleeve. The base assembly is engaged to the pulling sleeve.

17 Claims, 8 Drawing Sheets

U.S. PATENT DOCUMENTS

| | | |
|---|---|---|
| 6,398,422 B1 | 6/2002 | Szilagyi et al. |
| 6,719,274 B2 | 4/2004 | Bowling |
| 6,993,237 B2 | 1/2006 | Cooke et al. |
| 7,246,789 B2 | 7/2007 | Ames et al. |
| 7,869,685 B2 * | 1/2011 | Hendrickson et al. ........ 385/139 |
| 2006/0133748 A1 | 6/2006 | Seddon et al. |

* cited by examiner

CABLE PULLING ASSEMBLY

CROSS REFERENCE TO RELATED APPLICATION

The present application claims priority to U.S. Provisional Patent Application Ser. No. 61/032,806 entitled CABLE PULLING ASSEMBLY and filed on Feb. 29, 2008, the disclosure of which is hereby incorporated by reference in its entirety.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new constructions.

In either case, however, fiber optic cables are usually routed through enclosed spaces, such as between support structures disposed inside walls. In order to get the fiber optic cable through these enclosed spaces, cable pullers can be used. However, cable pullers are not always preferred since the use of cable pullers can result in damage to connectorized ends of the fiber optic cable. Therefore, there exists a need for a cable puller that reduces the risk of damage to the fiber optic cable.

SUMMARY

An aspect of the present disclosure relates to a cable pulling assembly. The cable pulling assembly includes a pulling sleeve, which includes a bore, and a base assembly. The base assembly is selectively engaged with the bore of the pulling sleeve. The base assembly includes a first base member and a second base member. The first and second base members cooperatively define a cable channel.

Another aspect of the present disclosure relates to a cable pulling assembly including a pulling sleeve, which includes a bore, and a base assembly. The base assembly is selectively engaged with the bore of the pulling sleeve. The base assembly includes a first base member and a second base member. The first and second base members cooperatively define a cable channel that is adapted to receive a portion of a cable. The cable channel includes a plurality of gripping protrusions that is adapted for friction fit engagement with the portion of the cable.

Another aspect of the present disclosure relates to a cable pulling assembly having a cable with a connectorized end, a base assembly, and a pulling sleeve. The base assembly includes a first base member selectively engaged with a second base member. The first and second base members define a cable channel having a cable portion and a connector portion. A portion of the cable is disposed in the cable portion. The cable portion is in friction fit engagement with the portion of the cable. The pulling sleeve defines a bore adapted to receive the connectorized end of the cable. The pulling sleeve is selectively engaged with the base assembly.

Another aspect of the present disclosure relates to a method of assembling a cable pulling assembly. The method includes inserting a portion of a cable having a connectorized end into a first channel of a first base member of a base assembly. The portion of the cable disposed in the first channel is in a friction fit engagement with the first channel. A second base member of the base assembly is engaged to the first base member. The second base member defines a second channel. The connectorized end of the cable is inserted into a bore of a pulling sleeve. The base assembly is engaged to the pulling sleeve.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
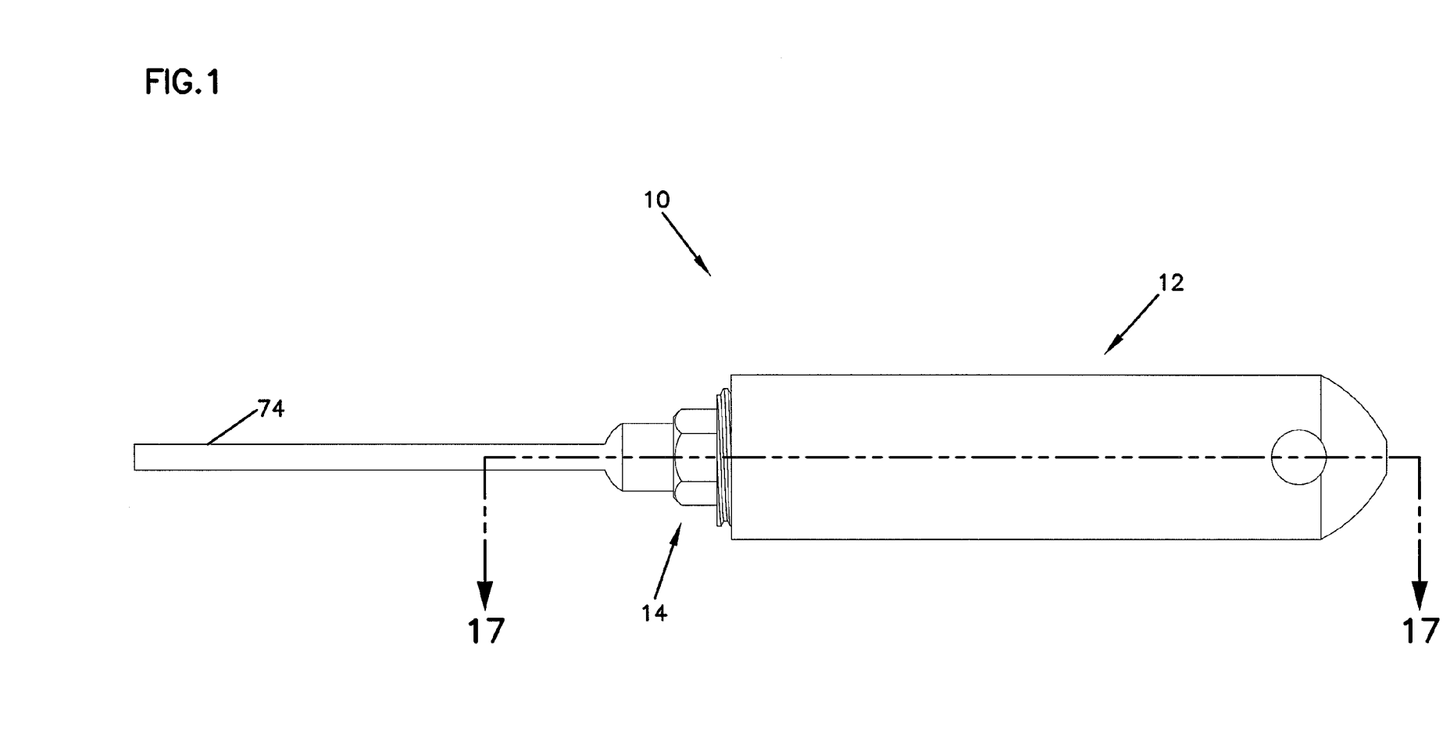
FIG. 1 is a side view of a cable pulling assembly having exemplary features of aspects in accordance with the principles of the present disclosure.

Referring now to FIG. 1, a cable pulling assembly, generally designated 10, is shown. The cable pulling assembly 10 includes a pulling sleeve, generally designated 12, and a base assembly, generally designated 14, adapted for engagement with the pulling sleeve 12.

Figure 2:
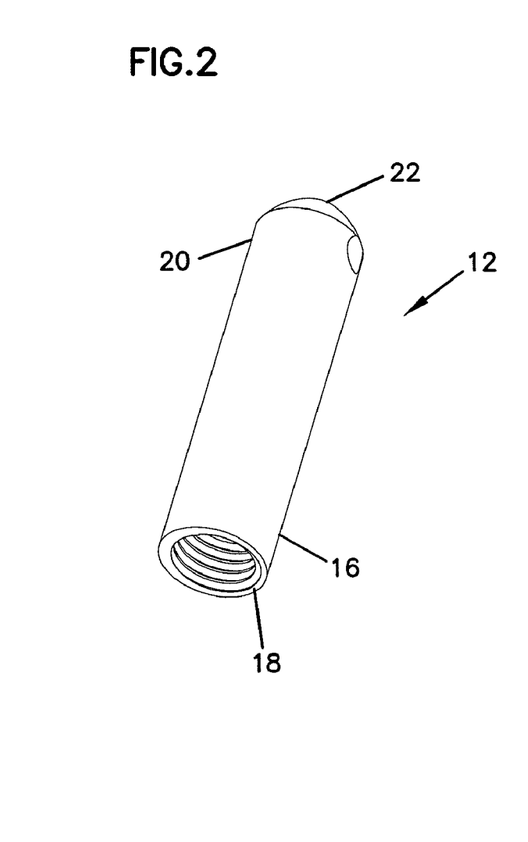
FIG. 2 is a perspective view of a pulling sleeve suitable for use with the cable pulling assembly of FIG. 1.
Figure 3:
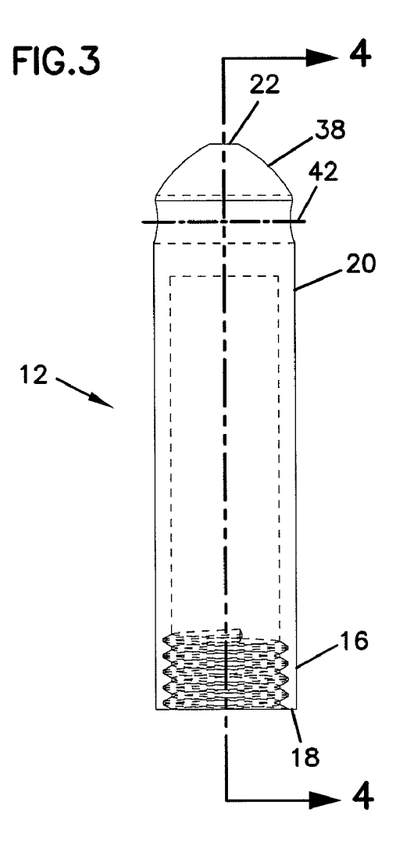
FIG. 3 is a top view of the pulling sleeve of FIG. 1.
Figure 4:
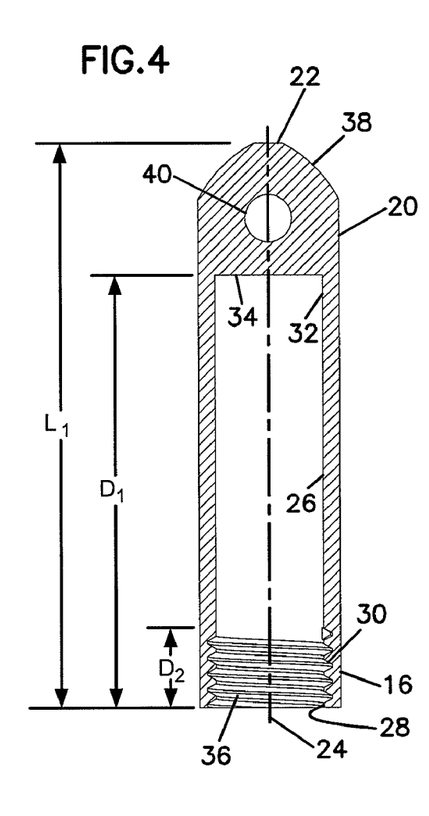
FIG. 4 is a cross-sectional view of the pulling sleeve taken on line 4-4 of FIG. 3.

Referring now to FIGS. 2-4, the pulling sleeve 12 is shown. The pulling sleeve 12 is generally cylindrical in shape. It will be understood, however, that the scope of the present disclosure is not limited to the pulling sleeve 12 being generally cylindrical in shape.

The pulling sleeve 12 includes a first axial end portion 16 having a first end surface 18 and an oppositely disposed second axial end portion 20 having a second end surface 22. The pulling sleeve 12 defines a longitudinal axis 24 (shown as a dashed line in FIG. 4) and a bore 26 that extends from the first end surface 18 of the first axial end portion 16 along the longitudinal axis 24. In the subject embodiment, the first end surface 18 of the first axial end portion 16 defines an opening 28 to the bore 26.

The bore 26 includes a first end 30 and an oppositely disposed second end 32. An end surface 34 is disposed at the second end portion 32 a distance $D_1$ from the first end surface 18 of the first axial end portion 16. In one embodiment, and by way of example only, the distance $D_1$ (shown only in FIG. 4) is greater than or equal to about 50% of a length $L_1$ (shown only in FIG. 4) of the pulling sleeve 12. In another embodiment, and by way of example only, the distance $D_1$ is greater than or equal to about 75% of the length $L_1$. While the bore 26 has been described and shown in FIG. 4 as being a blind bore, it will be understood that the scope of the present disclosure is not limited to the bore 26 being a blind bore.

In the subject embodiment, the first end 30 of the bore 26 defines a fastening feature 36. In the subject embodiment, the fastening feature 36 is adapted to receive the base assembly 14.

In the depicted embodiment, the fastening feature 36 is a set of internal threads that extend a distance $D_2$ (shown only in FIG. 4) from the first end surface 18 of the first axial end portion 16. In one embodiment, and by way of example only, the distance $D_2$ is less than or equal to about 50% of the length $L_1$. In another embodiment, and by way of example only, the distance $D_2$ is less than or equal to about 25% of the length $L_1$.

The second axial end portion 20 of the pulling sleeve 12 includes an outer surface 38 that tapers toward the second end surface 22 of the pulling sleeve 12. It will be understood, however, that the scope of the present disclosure is not limited to the outer surface 34 of the second axial end portion 20 tapering toward the second end surface 22 of the pulling sleeve 12.

The second axial end portion 20 of the pulling sleeve 12 defines a passageway 40 disposed in the second axial end portion 20. In the subject embodiment, the passageway 40 is a thru-hole that extends through the outer surface 34 of the second axial end portion 20 and defines an axis 42 (shown in FIG. 3). The axis 42 is generally perpendicular to the longitudinal axis 20 of the pulling sleeve 12. It will be understood, however, that the scope of the present disclosure is not limited to the axis 42 being generally perpendicular to the longitudinal axis 20.

Figure 5:
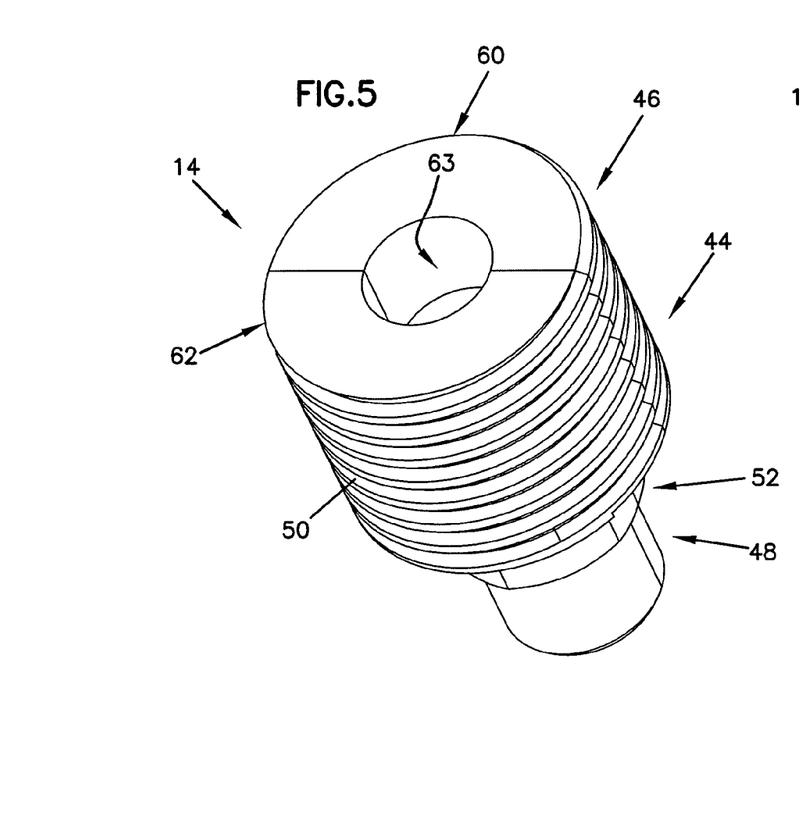
FIG. 5 is a perspective view of a base assembly suitable for use with the cable pulling assembly of FIG. 1.
Figure 6:
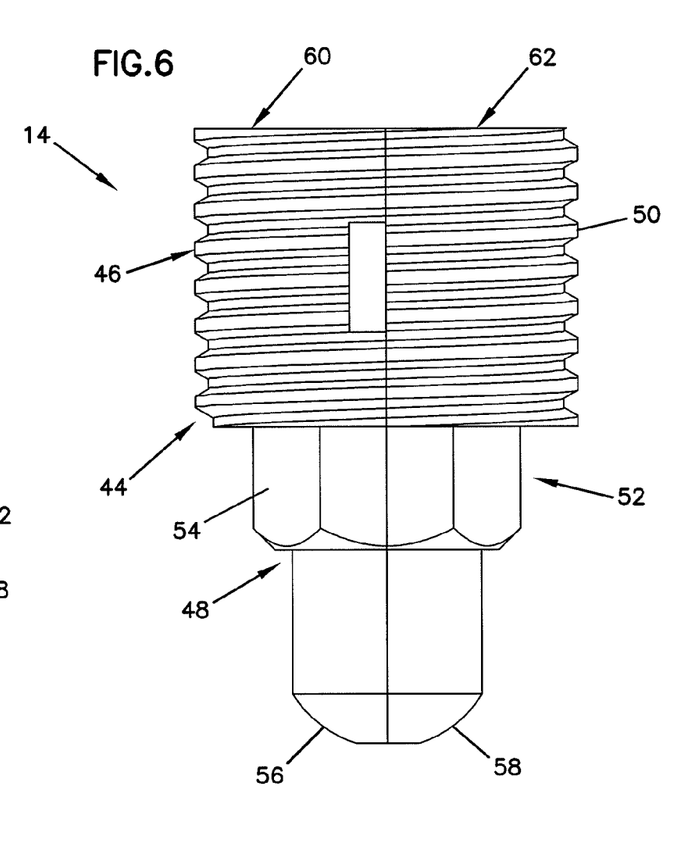
FIG. 6 is a side view of the base assembly of FIG. 5.

Referring now to FIGS. 5 and 6, the base assembly 14 is shown. The base assembly 14 includes an outer surface 44 having a first end portion 46 and an oppositely disposed second end portion 48. The first end portion 46 is adapted for engagement with the first end 30 of the bore 26 of the pulling sleeve 12. In the subject embodiment, the first end portion 46 includes a set of external threads 50 that are adapted for engagement with the fastening feature 36 of the pulling sleeve 12.

The second end portion 48 includes a gripping portion 52. The gripping portion 52 is disposed adjacent to the external threads 50 and provides a location at which the base assembly 14 can be grasped during engagement of the pulling sleeve 12 and the base assembly 14. In the subject embodiment, the gripping portion 52 includes a plurality of sides 54 (best shown in FIG. 6). In the depicted embodiment of FIG. 6, there are six sides 54 of the gripping portion 52 that form a hexagonal shape adapted for engagement with a wrench. While the gripping portion 52 has been described as having a plurality of sides 54, it will be understood that the scope of the present disclosure is not limited to the gripping portion having a plurality of sides 54 as the gripping portion 52 could alternatively include a texturized surface to assist with hand gripping by an installer.

In the subject embodiment, the second end portion 48 includes a tapered end portion 56. The tapered end portion 56 includes a partially rounded surface 58.

The base assembly 14 further includes a first base member 60 selectively engaged to a second base member 62. In the subject embodiment, the first and second base members 60 cooperatively define a cable channel 63 that extends longitudinally through the base assembly 14. In the subject embodiment, the first and second base members 60, 62 are separable. It will be understood, however, that the scope of the present disclosure is not limited to the first and second base members 60, 62 being separable.

Referring now to FIGS. 7-10, the first base member 60 is shown. The first base member 60 includes a first side face 64 and a first outer surface 66. In the subject embodiment, the first side face 64 is a generally planar surface, although it will be understood that the scope of the present disclosure is not limited to the first side face 64 being a generally planar surface. The first outer surface 66 forms at least a portion of the outer surface 44 of the base assembly 14. In the subject embodiment, the first outer surface is at least about half of the outer surface 44 of the base assembly. It will be understood, however, that the scope of the present disclosure is not limited to the first base member 60 being at least about half of the outer surface 44.

Figure 7:
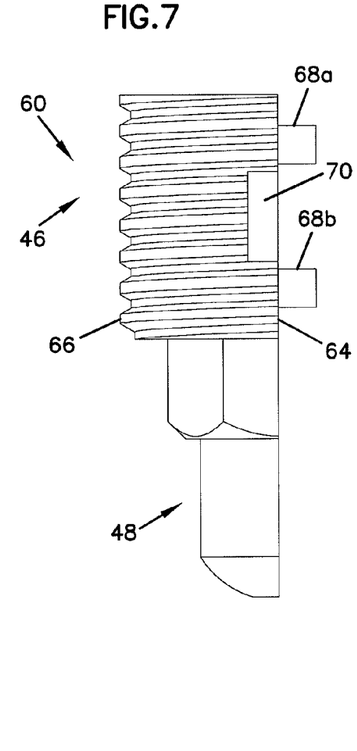
FIG. 7 is a side view of a first base member suitable for use in the base assembly of FIG. 5.
Figure 8:
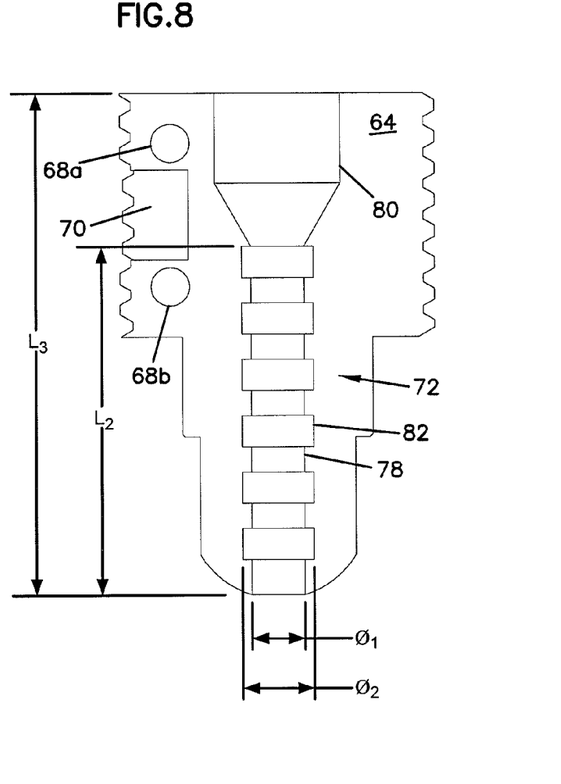
FIG. 8 is a rear view of the first base member of FIG. 7.
Figure 9:
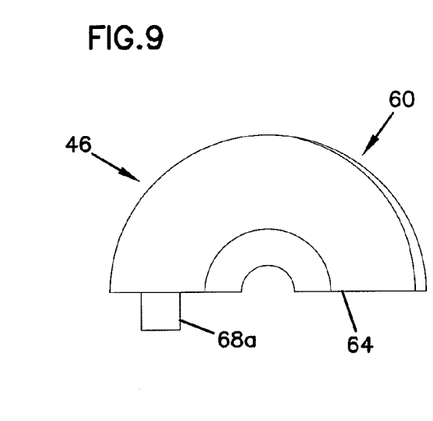
FIG. 9 is a top view of the first base member of FIG. 7.
Figure 10:
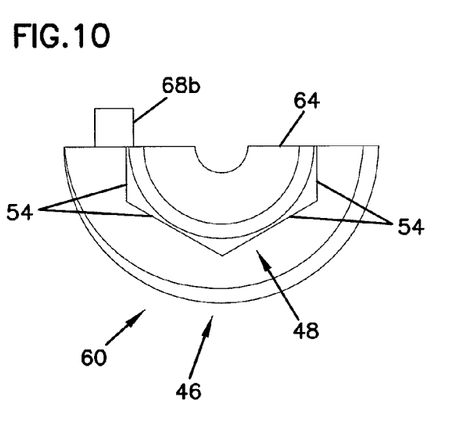
FIG. 10 is a bottom view of the first base member of FIG. 7.

The first side face 64 of the first base member 60 includes a first guide pin 68a and a second guide pin 68b (best shown in FIGS. 9 and 10) and defines a notch 70 (shown in FIGS. 7 and 8). The first and second guide pins 68a, 68b are adapted for engagement with the second base member 46 and extend outwardly from the first side face 64 in a direction that is generally perpendicular to the first side face 64. The notch 70 is a cavity disposed between the first and second guide pins 68a, 68b. The notch 70 is adapted to provide a location at which a tool or device can be inserted to separate the first and second base members 60, 62.

The first side face 64 further defines a first channel 72 that extends through the first and second end portions 46, 48. In the subject embodiment, the first channel 72 is a portion of the cable channel 63 of the base assembly 14. The first channel 72 is adapted to receive a portion of a cable 74 (shown in FIGS. 1, 16, and 17) having a connectorized end 76 (shown in FIGS. 16 and 17).

The first channel 72 includes a first cable portion 78 and a first connector portion 80. In the subject embodiment, the first cable portion 78 extends a length $L_2$ from the second end portion 48. In one embodiment, and by way of example only, the length $L_2$ is greater than about 50% of a length $L_3$ of the first base member 44. In another embodiment, and by way of example only, the length $L_2$ is in a range of about 50% to about 75% of the length $L_2$ of the first base member 44.

In one embodiment, the first cable portion 78 of the first channel 72 has an inner diameter $\varnothing_1$. The inner diameter $\varnothing_1$ is sized to be smaller than the outer diameter of the cable 74. In one embodiment, the inner diameter $\varnothing_1$ of the first cable portion 78 of the first channel 72 is greater than or equal to about 85% of the outer diameter of the cable 74.

The first channel 72 includes a first plurality of recesses 82. The first plurality of recesses 82 is intermittently disposed in the first channel 72. The recesses 82 define an inner diameter $\varnothing_2$ that is larger than the inner diameter $\varnothing_1$ of the first cable portion 78 of the first channel 72. In one embodiment, and by way of example only, the inner diameter $\varnothing_2$ is greater than or equal to about 25% of the inner diameter $\varnothing_1$ of the first cable portion 78 of the first channel 72. The first plurality of recesses 82 in the first cable portion 78 of the first channel 72 act as a relief for the cable 74 disposed in the first channel 72. With the first and second base members 60, 62 engaged, material from an outer jacket of the cable 74 may be elastically displaced as a result of a friction fit between the cable 74 and the first channel 72. The recesses 82 provide a displacement location for the elastically displaced material of the outer jacket of the cable 74.

The first connector portion 80 of the first channel 72 is adapted to receive at least a portion of the connectorized end 76 of the cable 74. In one embodiment, the first connector portion 80 is sized for a loose fit engagement with the connectorized end 76. The loose fit engagement is preferred so that when pulling the cable 74 with the cable pulling assembly 10, the connectorized end 76 is not stressed.

Figure 11:
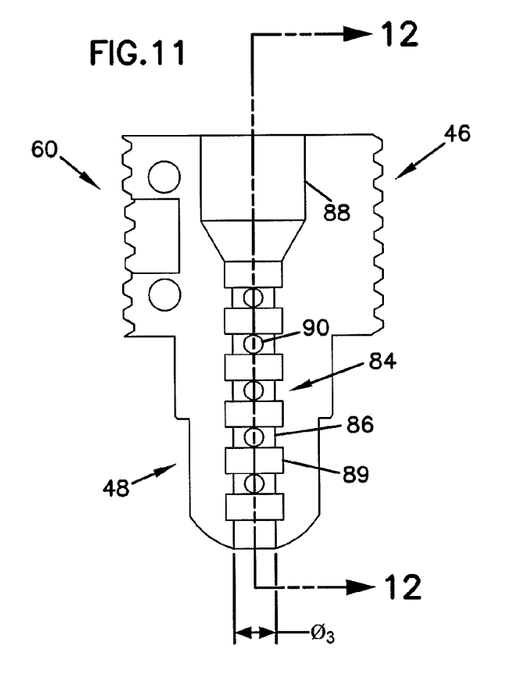
FIG. 11 is a rear view of an alternate embodiment of the first base member of FIG. 7.
Figure 12:
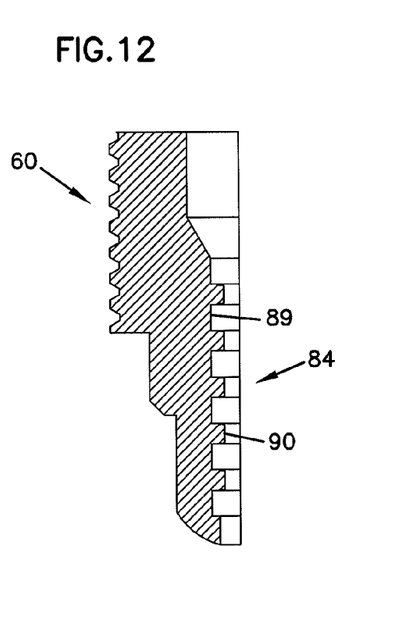
FIG. 12 is a cross-sectional view of the alternate embodiment of the first base member of FIG. 11 taken on line 12-12 of FIG. 11.
Figure 13:
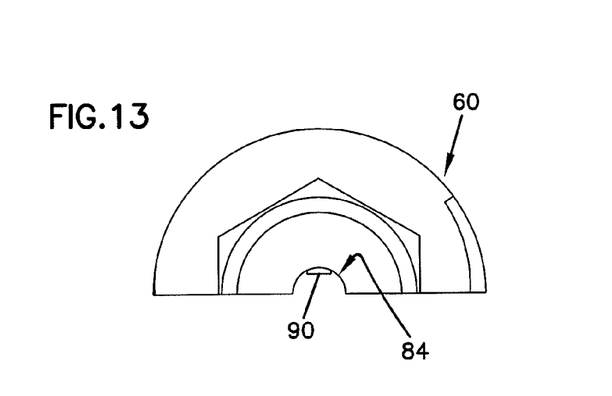
FIG. 13 is a bottom view of the alternate embodiment of the first base member of FIG. 11.

Referring now to FIGS. 11-13, an alternate embodiment of a first cable channel 84 in the first base member 60 is shown. The first cable channel 84 includes a first cable portion 86 and a first connector portion 88. The first cable portion 86 of the first cable channel 84 an inner diameter $Ø_3$. In one embodiment, the inner diameter $Ø_3$ is sized to be greater than or equal to the outer diameter of the cable 74.

The first cable portion 86 of the first cable channel 84 includes a first plurality of cable recesses 89. In the subject embodiment, the first cable channel 84 further includes a first plurality of gripping protrusions 90 with one of the first plurality of gripping protrusions 90 being disposed between adjacent recesses 89. In the subject embodiment, the gripping protrusions 90 are generally cylindrical in shape and extend outwardly from the first cable channel 84. When the cable 74 is inserted into the first cable channel 84 of the base assembly 14, the first plurality of gripping protrusions 90 are adapted to abut the outer surface of the cable 74 without piercing the outer jacket such that the first plurality of gripping protrusions 90 is in a friction fit with the outer jacket of the cable 74. This friction fit between the first plurality of gripping protrusions 90 and the cable 74 secures the cable 74 in the first cable channel 84 and allows a pulling force exerted on the pulling sleeve assembly 10 to be transferred to the outer jacket of the cable 74 rather than the connectorized end 76.

Figure 14:
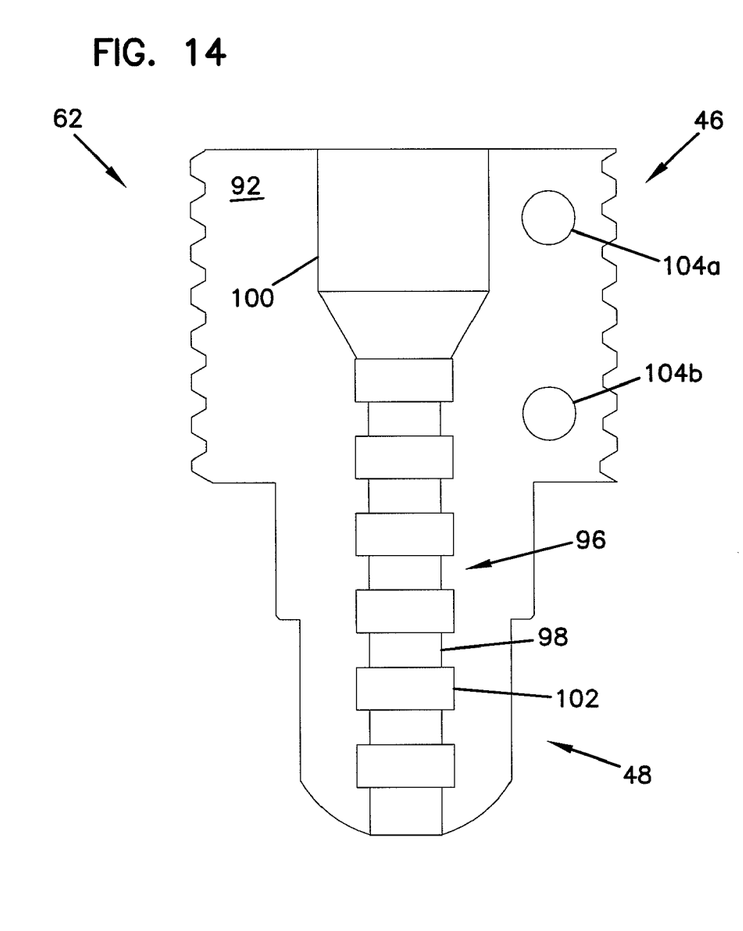
FIG. 14 is a front view of a second base member suitable for use with in base assembly.
Figure 15:
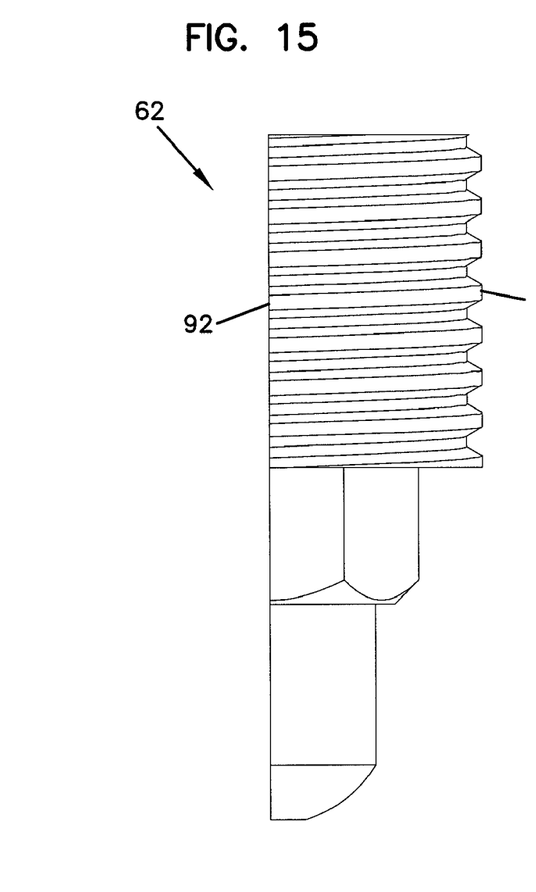
FIG. 15 is a side view of the second base member of FIG. 14.

Referring now to FIGS. 14 and 15, the second base member 62 is shown. The second base member 62 includes a second side face 92 and a second outer surface 94. In the subject embodiment, the second side face 92 is a generally planar surface, although it will be understood that the scope of the present disclosure is not limited to the second side face 92 being a generally planar surface. In the subject embodiment, the second outer surface 94 forms a remaining portion of the outer surface 44 of the base assembly 14. It will be understood, however, that the scope of the present disclosure is not limited to the second outer surface 94 forming the remaining portion of the outer surface 44 of the base assembly 14.

The second side face 92 defines a second channel 96 that extends through the first and second end portions 46, 48. In the subject embodiment, the second channel 96 is a portion of the cable channel 63 of the base assembly 14. The second channel 96 includes a second cable portion 98 and a second connector portion 100.

In the subject embodiment, the features of the second cable and connector portions 98, 100 of the second channel 96 are similar to the features of the first cable and connector portions 78, 80 of the first channel 72. As these features were fully described above with respect to the first channel 72, the second cable and connector portions 98, 100 of the second channel 96 will only be briefly described.

The second cable portion 98 of the second channel 96 defines a second plurality of recesses 102 intermittently disposed in the second channel 96. The recesses 102 define an inner diameter $Ø_4$ that is larger than an inner diameter $Ø_3$ of the second cable portion 98 of the second channel 76. In the subject embodiment, the inner diameter $Ø_3$ of the second cable portion 98 of the second channel 76 is about equal to the inner diameter $Ø_1$ of the first cable portion 78 of the first channel 72 while the inner diameter $Ø_4$ of the second plurality of recesses 102 is about equal to the inner diameter $Ø_2$ of the first plurality of recesses 82. In one embodiment, with inner diameter $Ø_1$ of the first cable portion 78 being sized for a friction fit with a portion of the cable 74 and with the inner diameter $Ø_3$ of the second cable portion 98 being about equal to the inner diameter $Ø_1$ of the first cable portion 78, the first and second cable portions 78, 98 are adapted to secure the cable 74 through a friction fit engagement.

In the subject embodiment, the second connector portion 100 of the second channel 96 is adapted to receive a remaining portion of the connectorized end 76 of the cable 74. In one embodiment, the first and second connector portions 80, 100 are sized for a loose fit engagement with the connectorized end 76.

The second side face 92 of the second base member 62 defines first and second guide receptacles 104a, 104b. In the subject embodiment, the first and second guide receptacles 104a, 104b are adapted to receive the first and second guide pins 64a, 64b of the first base member 60. Selective engagement of the first and second guide pins 64a, 64b with the first and second guide receptacles 104a, 104b maintains the first and second base members 60, 62 in proper alignment.

Figure 16:
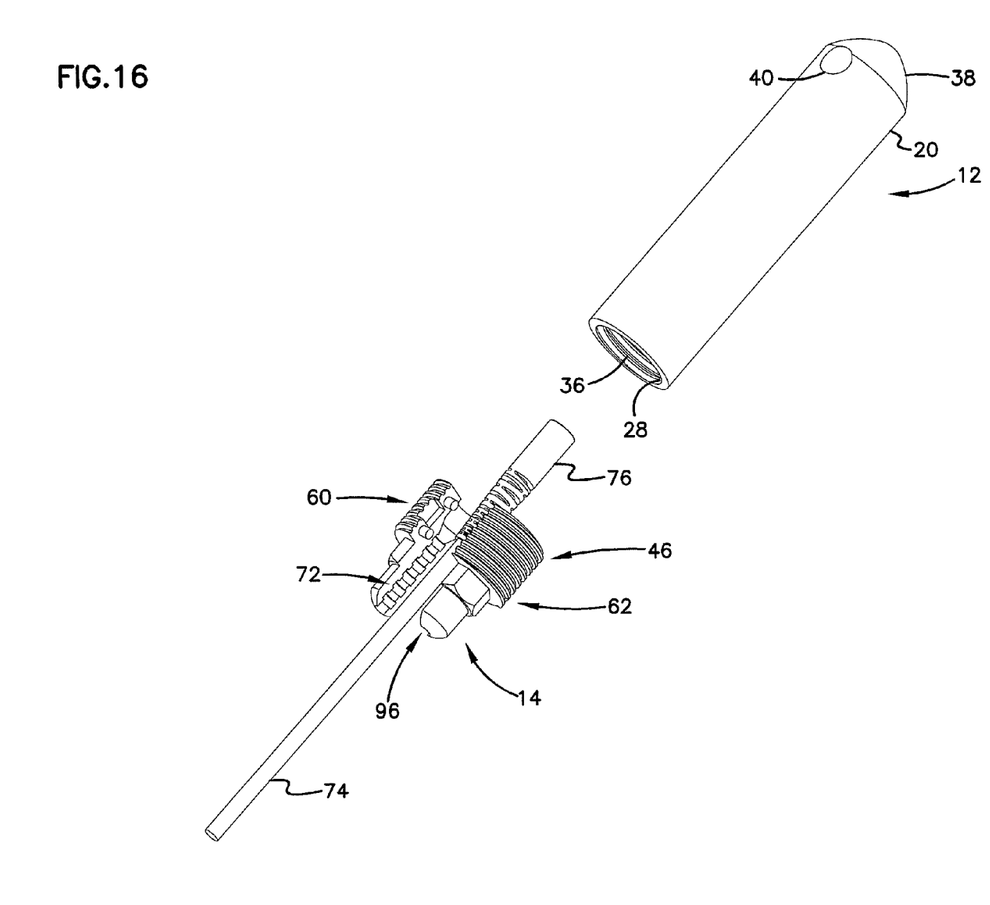
FIG. 16 is an exploded perspective view of the cable pulling assembly of FIG. 1.
Figure 17:
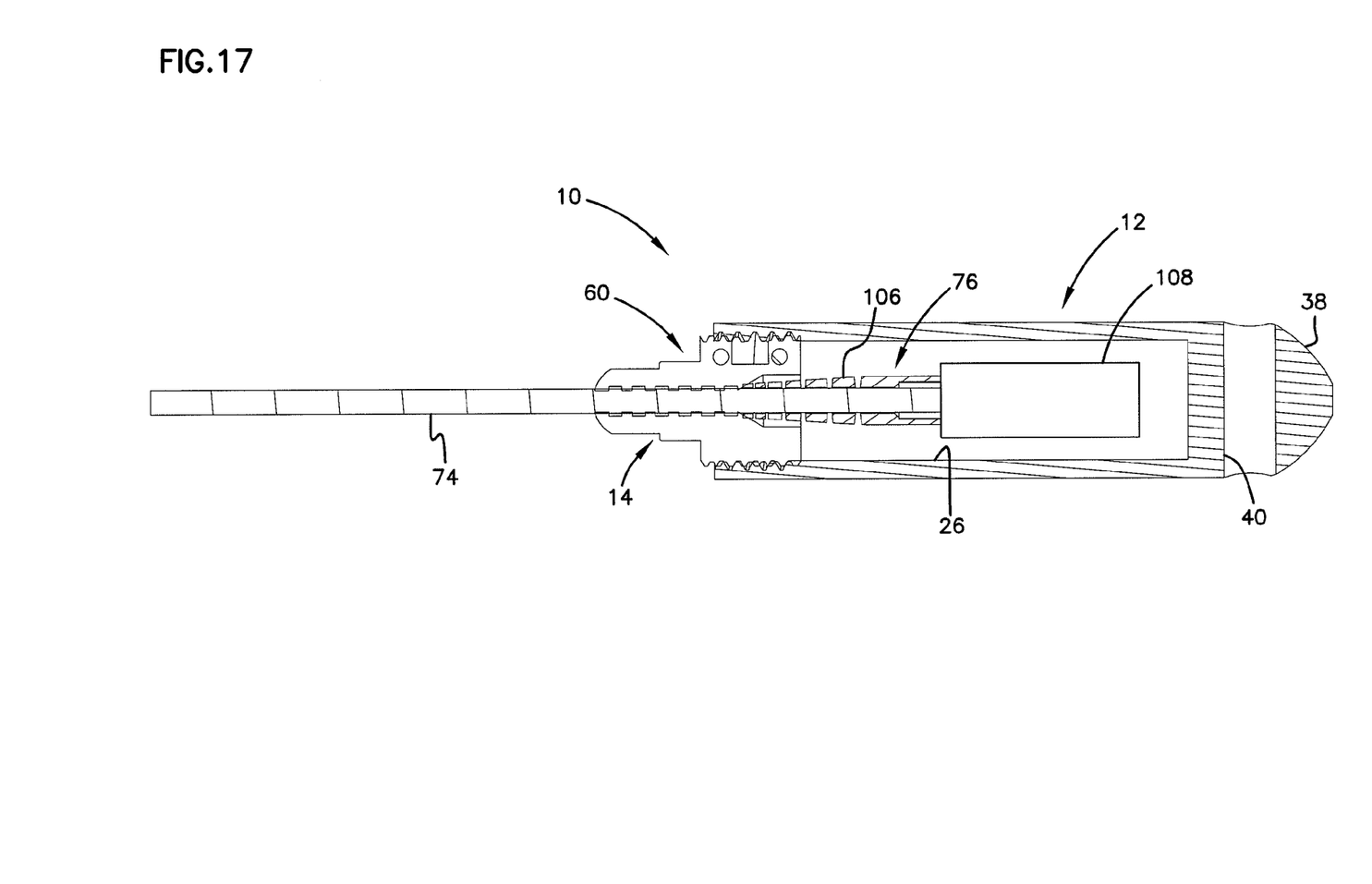
FIG. 17 is a cross-sectional view of the cable pulling assembly taken on line 17-17 of FIG. 1.

Referring now to FIGS. 16 and 17, the assembly and use of the cable pulling assembly 10 will be described. With the first and second base members 60, 62 disengaged, a portion of the cable 74 is inserted into one of the first and second channels 72, 96 of the first and second base members 60, 62, respectively. The portion of the cable 74 is inserted into one of the first and second cable portions 86, 98 such that a portion of the connectorized end 76 is disposed in one of the first and second connector portions 80, 100.

In the subject embodiment, the connectorized end 76 includes a strain relief boot 106 and a connector 108. In one embodiment, the connector 108 is a single fiber connector (e.g., SC, LX.5, LC, etc.). In another embodiment, the connector 108 is a multi-fiber connector.

In the subject embodiment, the portion of the connectorized end 76 disposed in one of the first and second connector portions 80, 100 is a portion of the strain relief boot 106. In another embodiment, the portion of the connectorized end 76 disposed in one of the first and second connector portions 80, 100 is a portion of the connector 108.

With the portion of the cable 74 inserted into one of the first and second channels 72, 96 of the first and second base members 60, 62, the first and second base member 60, 62 are engaged such that the portion of the cable 74 is enclosed by the first and second channels 72, 96.

The first end portion 46 of the base assembly 14 is then engaged with the first end 30 of the bore 26. In the subject embodiment, the first end 30 of the bore 26 is in threaded engagement with the first end portion 46 of the base assembly 14. In one embodiment, the base assembly 14 is held at the gripping portion 52 so that the base assembly 14 is substantially rotationally stationary. The connectorized end 76 of the cable 74 is inserted into the opening 28 of the pulling sleeve 12. The pulling sleeve 12 is then rotated so that the internal threads 36 of the first end 30 of the bore 26 of the pulling sleeve engage the external threads 50 on the outer surface 44 of the first end portion 46 of the base assembly 14. In one embodiment, the pulling sleeve 12 is rotated by hand. In another embodiment, the pulling sleeve 12 is rotated by a pin that is inserted through the passageway 40.

The pulling sleeve 12 is rotated until at least a portion of the first end portion 46 of the base assembly 14 is disposed within the bore 26 of the pulling sleeve 12. The engagement between the pulling sleeve 12 and the base assembly 14 secures the first and second base members 60, 62 together.

In use, with the cable 74 disposed in the cable pulling assembly 10, a pulling member (e.g., string, cable, fish tape, etc.) is inserted through the passageway 40 of the pulling sleeve 12. The cable pulling assembly 10 can then be pulled by the pulling member from a first location to a second location through an enclosed space (e.g., a duct, a conduit, a wall, etc.). The taper of the outer surface 38 of the second axial end portion 20 of the pulling sleeve 12 reduces the risk of the cable pulling assembly 10 abutting a surface in the enclosed space.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cable pulling assembly comprising:
    a pulling sleeve defining a bore having a set of internal threads;
    a base assembly selectively threadedly engaged with the set of internal threads of the bore of the pulling sleeve, the base assembly including a first base member selectively engaged to a second base member, the first and second base members of the base assembly cooperatively defining a cable channel adapted for receiving a portion of an outer jacket of a cable, wherein the first and second base members are separable, and wherein the cable channel includes a plurality of cylindrical gripping protrusions adapted for friction fit engagement with the portion of the outer jacket of the cable, wherein the first base member defines a first channel and the second base member defines a second channel, wherein the first channel includes a first cable portion and a first connector portion and the second channel includes a second cable portion and a second connector portion, wherein the first and second cable portions are adapted for receiving the portion of the outer jacket of the cable and the first and second connector portions are adapted for receiving a portion of a connectorized end of the cable.

2. A cable pulling assembly as claimed in claim 1, wherein each of the first and second cable portions includes a plurality of recesses intermittently disposed in the first and second cable portions.

3. A cable pulling assembly as claimed in claim 1, wherein each of the first and second cable portions include a plurality of gripping protrusions adapted for friction fit engagement with the portion of the outer jacket of the cable.

4. A cable pulling assembly comprising:
    a cable having an outer jacket and a connectorized end;
    a base assembly including a set of external threads and a first base member in selective engagement with a second base member, the first and second base members of the base assembly defining a cable channel having a cable portion and a connector portion, a portion of the outer jacket of the cable being disposed in the cable portion and a portion of the connectorized end being disposed in the connector portion, wherein the cable portion is in friction fit engagement with the portion of the outer jacket of the cable; and
    a pulling sleeve defining a bore that is adapted to receive the connectorized end, wherein the pulling sleeve is selectively threadedly engaged with the set of external threads of the base assembly.

5. A cable pulling assembly as claimed in claim 4, wherein the first base member defines a first cable channel and the second base member defines a second cable channel, wherein the first and second cable channels cooperatively define the cable channel.

6. A cable pulling assembly as claimed in claim 4, wherein the connector portion of the cable channel of the base assembly is adapted for loose fit engagement with the portion of the connectorized end.

7. A cable pulling assembly as claimed in claim 4, wherein the cable portion of the cable channel includes a plurality of gripping protrusions.

8. A cable pulling assembly as claimed in claim 4, wherein the cable portion of the cable channel includes a plurality of recesses intermittently disposed in the cable channel.

9. A cable pulling assembly as claimed in claim 4, wherein the pulling sleeve includes a first axial end portion defining an opening to the bore and an oppositely disposed second axial end portion, wherein the second axial end portion defines a passageway that is adapted to receive a pulling member.

10. A cable pulling assembly as claimed in claim 9, wherein the second axial end portion of the pulling sleeve includes a tapered outer surface.

11. A cable pulling assembly as claimed in claim 4, wherein the first base member is generally about half of the base assembly.

12. A cable pulling assembly as claimed in claim 4, wherein a length of the cable portion is greater than or equal to about 50% of a length of the base assembly.

13. A method of assembling a cable pulling assembly, the method comprising:
    inserting a portion of an outer jacket of a cable having a connectorized end into a first channel of a first base member of a base assembly,
        wherein the first channel includes a first cable portion and a first connector portion, and wherein the portion of the outer jacket of the cable disposed in the first channel is in a friction fit engagement with the first cable portion of the first channel;
    inserting a portion of the connectorized end into the first connector portion of the first channel;
    engaging a second base member of the base assembly to the first base member, wherein the second base member defines a second channel;
    inserting the connectorized end of the cable into a bore of a pulling sleeve; and
    threadedly engaging external threads of the base assembly to internal threads of the pulling sleeve.

14. A method of assembling a cable pulling assembly as claimed in claim 13, wherein the first channel includes a plurality of gripping protrusions that is in a friction fit engagement with the portion of the outer jacket the cable.

15. A method of assembling a cable pulling assembly as claimed in claim 13, wherein the first connector portion is adapted for a loose fit engagement with the portion of the connectorized end.

16. A method of assembling a cable pulling assembly as claimed in claim 15, wherein the first connector portion is adapted for a loose fit engagement with a strain relief boot of the connectorized end.

17. A cable pulling assembly comprising:
  a cable having an outer jacket and a connectorized end;
  a base assembly having a first end portion and an oppositely disposed second end portion and being disposed about a portion of the outer jacket and the connectorized end of the cable so that a remaining portion of the connectorized end extends outwardly from the first end portion and a remaining portion of the outer jacket extends outwardly from the second end portion, the first end portion having a plurality of external threads, the base assembly including:
    a first base member defining a first channel, the first channel including a plurality of gripping protrusions that extend into the first channel, the plurality of gripping protrusions being in friction fit engagement with the portion of the outer jacket;
    a second base member in selective engagement with the first base member, the second base member defining a second channel, the first and second channels cooperatively forming a cable channel that extends through the first and second end portions of the base assembly and that receives the portion of the outer jacket and the connectorized end of the cable; and
  a pulling sleeve defining a bore in which the connectorized end is disposed, the bore having a plurality of internal threads being in threaded engagement with the first end portion of the base assembly, the pulling sleeve defining a passageway that is adapted to receive a pulling member;
  wherein a pulling force exerted on the pulling sleeve is transferred to the outer jacket of the cable through the friction fit engagement of the base assembly and the outer jacket.

* * * * *